United States Patent
Singh et al.

(10) Patent No.: US 9,344,938 B1
(45) Date of Patent: May 17, 2016

(54) NETWORK CONTROLLER MANAGEMENT OF UE CONTEXT RECORDS

(71) Applicant: Sprint Spectrum L.P., Overland Park, KS (US)

(72) Inventors: Jasinder P. Singh, Olathe, KS (US); Deveshkumar Rai, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 321 days.

(21) Appl. No.: 13/963,702

(22) Filed: Aug. 9, 2013

(51) Int. Cl.
- *H04W 36/12* (2009.01)
- *H04W 8/12* (2009.01)
- *H04W 8/20* (2009.01)
- *H04W 36/00* (2009.01)
- *H04W 36/22* (2009.01)

(52) U.S. Cl.
CPC .............. *H04W 36/12* (2013.01); *H04W 8/12* (2013.01); *H04W 8/205* (2013.01); *H04W 36/0033* (2013.01); *H04W 36/22* (2013.01)

(58) Field of Classification Search
None
See application file for complete search history.

(56) References Cited

U.S. PATENT DOCUMENTS

| | | | |
|---|---|---|---|
| 7,058,031 B2 | 6/2006 | Bender et al. | |
| 8,264,956 B2* | 9/2012 | Ramankutty | H04L 45/025 370/228 |
| 8,908,603 B2* | 12/2014 | Olsson | 370/221 |
| 2009/0248755 A1* | 10/2009 | Watanabe | G06F 1/3209 |
| 2010/0220656 A1* | 9/2010 | Ramankutty | H04L 45/025 370/328 |
| 2011/0205900 A1* | 8/2011 | Zhang | H04L 12/437 370/237 |
| 2011/0235505 A1* | 9/2011 | Eswara | H04L 43/10 370/221 |
| 2012/0023360 A1* | 1/2012 | Chang | G06F 11/0709 714/4.11 |
| 2013/0070669 A1* | 3/2013 | Haynes | H04W 8/24 370/328 |
| 2013/0100813 A1* | 4/2013 | Velamati | H04W 8/12 370/236 |
| 2013/0188555 A1* | 7/2013 | Olsson | H04W 8/30 370/328 |
| 2013/0189951 A1* | 7/2013 | Lopez | H04W 12/08 455/411 |

OTHER PUBLICATIONS

Wired n Wireless, "MME Pool—Load Balancing and Re-balancing," www.wired-n-wireless.blogspot.com/2011/02/mme-pool-load-balancing-and.re.html, printed from the World Wide Web on Feb. 19, 2013.

* cited by examiner

*Primary Examiner* — Redentor Pasia

(57) ABSTRACT

A method and corresponding system and apparatus to help manage UE context records. When a network controller detects that it is at or approaching a context record storage limit, such as might be imposed by license agreement for instance, the network controller offload one or more of its stored UE context records to another network controller to be stored temporarily by the other network controller until needed, even though the other network controller is not serving the UE(s) at issue.

19 Claims, 3 Drawing Sheets

NETWORK CONTROLLER MANAGEMENT OF UE CONTEXT RECORDS

BACKGROUND

Unless otherwise indicated herein, the materials described in this section are not prior art to the claims and are not admitted to be prior art by inclusion in this section.

In general, a communication network may be arranged to serve a plurality of user equipment devices (UEs) such as telephones, computers, appliances, and other devices, whether through wired and/or wireless connections, to provide the UEs with access to a transport network such the public switched telephone network (PSTN) or the Internet and/or to enable the UEs to communicate with each other or with other entities. To facilitate this, the communication network may include a plurality of network controllers that manage various aspects of UE connectivity and service. In operation, a UE may be served by a given one of these network controllers, such as a controller that is arranged to serve UEs in a particular location, subnet, or the like where the UE is operating.

A specific example of this, in the wireless realm, is a network arranged in accordance with the Long Term Evolution (LTE) protocol. Such a network may include a plurality of mobility management entities (MMEs) that function as controllers to facilitate setup and management of bearers through which UEs can engage in data communication, to facilitate tracking and status of UEs throughout the LTE network, and to facilitate paging of UEs for incoming communications. Each MME may be arranged to serve as a network controller for one or more portion of the LTE network known as tracking areas, each of which may include a number of LTE base stations known as eNodeBs arranged to provide wireless coverage for UEs. Thus, an MME may be considered to serve the UEs that are operating within coverage of an eNodeB in a tracking area served by the MME. Other examples of controllers in an LTE network are possible as well, as are assorted types of controllers in other types of networks.

In any such network, when a controller serves a UE, the controller may store a context record for the UE. Such a context record may include information that helps the controller serve the UE, such as data specifying a subscription profile for the UE, data specifying capabilities of the UE, and data specifying service status of the UE such as particular bearers or other connections that are established for the UE. The controller may then make use of that context record while serving the UE. For example, if the UE seeks to engage in a particular type of communication, the controller may refer to the UE's context record to determine if that type of communication is authorized by the UE's subscription profile and if so may allow the communication. As another example, in a wireless realm, as the UE transitions between an active or "connected" mode in which the UE has an assigned radio link and an "idle" mode in which the UE does not have an assigned radio link, the controller may receive signaling indicative of that transition and may update the UE's context record to indicate whether the UE is currently operating in the connected mode or in the idle mode.

As still another example, also in the wireless realm, as the UE transitions from being served by one base station to being served by another base station, the controller may receive signaling indicative of that transition and may manage transition of any bearer connections established for the UE and may update the UE's context record accordingly. And as yet another example, also in the wireless realm, as the UE moves between tracking areas, the controller may receive tracking area updates or registration messages and may update the UE's context record to indicate the tracking area in which the UE is currently operating. Further, as still another example, also in the wireless realm, the controller may receive signaling indicative of an incoming communication to be delivered to a UE, the controller may refer to the UE's context record to determine that the UE is currently operating in the idle mode and to determine the UE's current tracking area, and the controller may then direct one or more base stations of the UE's tracking area to page the UE so as to trigger transition of the UE to the connected mode in which the communication can be delivered to the UE. Numerous variations on these examples and other examples are possible as well.

OVERVIEW

A network controller may be configured with a limit on the number of UE context records that it is allowed to store. In practice, this limit could be a result of a license agreement between a network service provider and a vendor of the network controller or of software or hardware associated with the network controller. For instance, a vendor of the network controller may charge the network service provider a particular license fee in exchange for a particular number of context record license seats on the network controller. Thus, possibly regardless of the processing capacity and actual storage capacity of the network controller, the network controller may be configured to store up to, and no more than, that licensed number of UE context records. Other bases for a network controller's limit on number of UE context records that it is allowed to store, aside from license requirements, are possible as well.

Unfortunately, as a result of this limit on number of UE context records that a network controller is allowed to store, if the network controller reaches this limit, the network controller may be unable to serve additional UEs until the number of UE context records stored by the network controller decreases sufficiently. Alternatively, when the network controller reaches the limit, the network controller may be configured to allow storage of additional context records but for payment of an additional license fee; in such a scenario, the network controller would still be considered to have a limit on the number of context records storable by that network controller, and additional context record storage would be considered to go beyond that limit. In either case, the result of reaching the limit may be undesirable, as the network may need to block UE service or the network service provider may incur additional cost for context record storage. Consequently, an improvement is desired.

Disclosed herein is a method and corresponding system and apparatus to help overcome this problem. In accordance with the disclosure, when a network controller detects that it is at or approaching its context record storage limit, the network controller will advantageously offload one or more of its stored UE context records to another network controller to be stored temporarily by the other network controller until needed, even though the other network controller is not serving the UE(s) at issue.

The advantage of this arrangement becomes especially apparent where each network controller has a respective license limit on the number of UE context record that it is allowed to store. If a first network controller is serving or likely to serve so many UEs that the first network controller is at or approaching its license limit for context record storage, but if a second network controller has a sufficient number of unused context record license seats, the first network controller can transfer some context records to the second controller for temporary storage. That way, the first network controller would free up some of its context record license seats to be able to serve additional UEs, and the second network controller would use some of its own context record license seats to store context records for the first network controller. When the first network controller then needs to access a particular context record that the second network controller is holding for the first network controller, assuming the first network controller has an available context record license seat, first network controller may then simply retrieve the particular context record from the second network controller and access it.

In practice, a first network controller that detects it is at or approaching its context record storage limit may engage in signaling with one or more other network controllers, and/or query a centralized server, to identify a second network controller that has sufficient context record storage capacity (e.g., is sufficiently below its context record storage limit). Further, the first network controller may select one or more context records stored by the first network controller to be temporarily offloaded to the second network controller for storage by the second network controller. For instance, in a wireless network (or, if applicable, in a non-wireless network), the first network controller may select the one or more context records based on which UEs served by the first network controller have been idle for the longest time, as it may be least likely that the network controller would need to access those UEs' context records anytime soon. The first network controller may then transfer the selected context record(s) to the second network controller, so that the context record(s) would be stored by the second network controller rather than by the first network controller, even though the first network controller is serving the UE(s) and the second network controller is not.

Thereafter, if and when the first network controller then encounters a situation where the first network controller needs to take action for a UE that the first network controller serves but whose context record is currently offloaded to the second network controller, the first network controller may request the context record back from the second network controller. The first network controller may then receive the context record back from the second network controller, so that the second network controller no longer stores the context record but the first network again stores the context record. And the first network controller may then take the action for the UE.

Accordingly, in one respect, disclosed is a method operable in a communication network that has a plurality of network controllers configured to serve UEs, where each network controller stores a UE context record respectively for each of a plurality of UEs that the network controller serves, and where each network controller has a respective context record limit defining a maximum number of UE context records storable by the network controller (as discussed above for instance).

In accordance with the disclosed method, a first network controller of the plurality detects threshold storage of UE context records by the first network controller. Further, in response to detecting that threshold storage of UE context records by the first network controller, the first network controller then selects a UE that is served by the first network controller but that is in an idle mode of operation, and that selected UE context record is temporarily offloaded from the first network controller to a second network controller for storage by the second network controller even though the second network controller is not serving the UE. Thus, the second network controller rather than the first network controller then stores the UE context record for the selected UE.

In turn, while the UE context record for the selected UE is stored by the second network controller to which the UE context record was offloaded even though the second network controller is not serving the UE, the first network controller receives a signaling message that triggers the first network controller to take action for the selected UE. And in response to receipt of that message, the first network controller (a) retrieves the offloaded context record from the second network controller, (b) re-stores the retrieved context record, and (c) takes the action by for the selected UE.

In another respect, disclosed is a communication system that includes a plurality of network controllers configured to serve UEs, where each network controller stores a UE context record respectively for each UE of a plurality of UEs that the network controller serves, and where each network controller has a respective context record limit defining a maximum number of UE context records storable by the network controller (as discussed above for instance).

In such a communication system, a first network controller of the plurality of the network controllers is configured to detect threshold storage of UE context records by the first network controller and, in response to detecting the threshold storage of UE context records by the first network controller, (a) to select a UE that is served by the first network controller but that is in an idle mode of operation and (b) to temporarily offload the UE context record of the selected UE from the first network controller to a second network controller for storage by the second network controller even though the second network controller is not serving the UE. Thus, the second network controller rather than the first network controller then stores the UE context record for the selected UE.

Further, the first network controller may be configured to receive, while the UE context record for the selected UE is stored by the second network controller to which the UE context record was offloaded even though the second network controller is not serving the UE, a signaling message that triggers the first network controller to take action for the selected UE. And the first network controller may be configured to respond to receipt of the control message that triggers the first network controller to take action, by (a) retrieving the offloaded context record from the second network controller, (b) re-storing the retrieved context record, and (c) taking the action for the selected UE.

In addition, in still another respect, disclosed is an MME operable in an LTE network. The MME is arranged to serve a plurality of UEs, and the MME includes a network communication interface for communicating with other entities of the LTE network, a processing unit, and data storage arranged to hold UE context records, where the UE context records comprise a UE context record respectively for each UE of the plurality of UEs served by the MME. Further, the data storage holds program instructions executable by the processing unit to cause the MME to carry out functions including (a) detecting threshold storage by the MME of UE context records, (b) responsive to the detecting, selecting a UE that is served by the MME and that is currently in an idle mode of operation, and (c) temporarily offloading the UE context record of the selected UE from the MME to another MME that is not currently serving the UE.

Further, the functions may include (d) while the UE context record for the selected UE is stored by the other MME that is not currently serving the UE, receiving a signaling message that triggers the MME to take action for the selected and (e) responsive to receipt of the message that triggers the MME to take action, (i) retrieving the offloaded context record from the other MME, (ii) re-storing the retrieved context record, and (iii) taking the action for the selected UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

For simplicity, the present method and corresponding system and apparatus will be described in the context of an LTE network that functions to provide UEs with wireless packet-data connectivity and perhaps other service. Principles of the method, system, and apparatus are not limited to this specific arrangement, however, and could apply in the context of other networks, whether wired and/or wireless. For example, the disclosure could apply as well in the context of wireless networks operating according to other protocols, such as CDMA, GSM, WIFI, or the like. And as another example, the disclosure could apply in the context of a wired network such as a landline telephone network or wired local area network. Other examples are possible as well.

Figure 1:
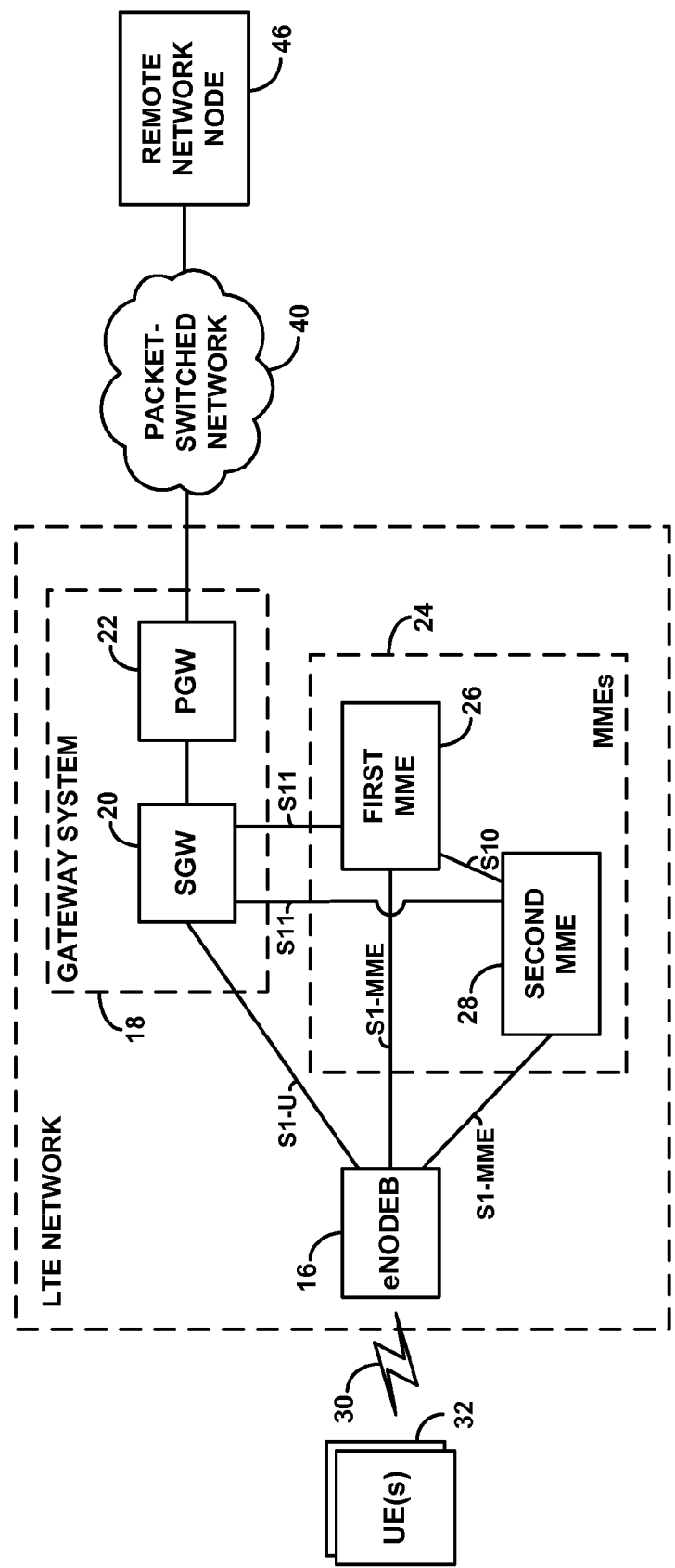
FIG. 1 is a simplified block diagram of an example network arrangement in which aspects of the present disclosure can be implemented.

FIG. 1 is thus a simplified block diagram of a representative network arrangement in which aspects of the present method can be implemented. In particular, the representative arrangement includes an LTE network 12 that is arranged to serve UEs with wireless packet data communication service (including perhaps voice-over-packet service and other real-time media services).

LTE network 12 is shown including a representative LTE eNodeB 16, a gateway system 18 including a serving gateway (SGW) 20 and a packet data network (PDN) gateway (PGW) 22, and a number of MMEs 24 including by way of example a first MME 26 and a second MME 28. In practice, the eNodeB 16 includes an antenna structure and associated equipment for engaging in LTE communication over an air interface 30 with UEs 32, and the PGW 22 provides connectivity with a packet-switched network 40 such as the Internet. Further, the eNodeB communicates with the SGW over an S1-U interface, the eNodeB communicates with each of the MMEs over a respective S1-MME interface, each MME communicates with the SGW over a respective S11 interface, and the MMEs communicate with each other over respective S10 interfaces. Although each of these interfaces is shown as a direct link in the figure, in practice the various elements of the LTE network may sit as nodes on a wireless carrier's core packet network, and so these and other interfaces described herein may instead be logical connections over that packet network.

In practice, eNodeB 16 may be associated with the first MME 26, such as by operating in a tracking area served by the first MME 26. When a UE enters into coverage of the eNodeB 16, the UE may register or "attach" with the LTE network 12 by transmitting an attach request to the eNodeB, which the eNodeB would thus forward to the first MME 26. The first MME may then carry out various functions to facilitate serving of the UE.

By way of example, when the UE first attaches, the first MME may engage in signaling with a home subscriber server (HSS) 36 to authenticate the UE for service in the LTE network. In that process, the first MME may receive from the HSS a service profile record specifying various service authorizations for the UE. Further, as part of the attach process, the first MME may receive UE capability information from the UE and/or from the HSS. The first MME may then generate and store a UE context record for the UE, specifying the service profile and capabilities information and an identifier (such as a temporary mobile subscriber identifier) of the UE, for reference by the first MME while serving the UE.

As another example, the first MME may engage in signaling with the gateway system and with the eNodeB in order to set up and manage one or more bearer connections extending between the UE and the PGW and thus between the UE and the packet-switched network 40. For instance, for each such bearer connection, the first MME may record in the UE's context record an evolved packet system (EPS) bearer identity for the WCD, and the first MME may generate and transmit to the SGW a create-session request identifying the serving eNodeB and triggering setup of a tunnel between the SGW and PGW and assignment of an Internet Protocol (IP) address for the UE. Further, upon receipt of a create-session response from the SGW, the first MME may then further generate and transmit to the eNodeB an attach-accept message identifying the SGW and triggering setup of a tunnel between the eNodeB and the SGW and assignment of a corresponding radio bearer identity defining a tunnel between the UE and the eNodeB. Thus, the primary MME may thereby manage establishment of a bearer defining a series of tunnels extending (i) between the UE and the eNodeB, (ii) between the eNodeB and the SGW, and (iii) between the SGW and the PGW. With each such bearer established, the UE may then engage in packet-switched communication on network 40, to communicate with a remote packet network node 46.

In general, the air interface that carries communications wirelessly between the UE and the eNodeB defines a radio link. When a UE first attaches, the UE enters into a Radio Resource Control (RRC) "connected" mode in which the UE interacts with the eNodeB for transmission of bearer data between the UE and the eNodeB, and the MME records in the UE's context record an indication that the UE is in the connected mode. In that mode, if the UE has bearer data to transmit, the UE may send a service request to the eNodeB, and the eNodeB may then direct the UE to transmit the data using particular air interface resources such as particular LTE resource blocks. Likewise, if the eNodeB has bearer data to transmit to the UE, the eNodeB may transmit the data to the UE using particular air interface resources such as particular LTE resource blocks.

When no bearer data has passed over the air to or from the UE for a threshold period of time, or for other reasons, the UE may then transition from the RRC connected mode to an RRC "idle" mode, in which the UE does not interact with the eNodeB for transmission of bearer data between the UE and the eNodeB. This transition may be considered to involve releasing of the UE's radio link, so, in the idle mode, the UE may be considered to not have a radio link. However, the UE may still have one or more established bearers extending between its serving eNodeB and the PGW, and the first MME serving the UE may still have a context record stored for the UE. When the UE transitions from the RRC connected mode to the RRC idle mode, associated signaling may pass from the eNodeB to the first MME, since the first MME is the MME serving the UE, and the first MME may update the UE's context record to indicate that the UE is now in the idle mode.

While in the idle mode, if the UE has bearer data to transmit, the UE may transmit to the eNodeB an RRC connection reestablishment message, and the eNodeB may positively respond, transitioning the UE from the idle mode back to the connected mode. Further, associated signaling may pass from the eNodeB to the first MME, again since the first MME is the MME serving the UE, and the first MME may update the UE's context record to indicate that the UE is now once again in the connected mode.

On the other hand, when the gateway system or another entity (e.g., a circuit-switched fallback interworking server (not shown)) has bearer data to send to the UE while the UE is in the idle mode, the gateway system or that other entity may transmit an associated signaling message to the first MME, since the first MME is the MME serving the UE, to trigger paging of the UE. In response, the MME may then invoke a process of paging the MME, such as by causing the eNodeB to broadcast one or more page messages over the air. Upon receipt of such a page message, the UE may then similarly send to the eNodeB an RRC connection reestablishment message, and the eNodeB may positively respond, transitioning the UE from the idle mode back to the connected mode. Further, here again, associated signaling may pass from the eNodeB to the first MME, again since the first MME is the MME serving the UE, and the first MME may update the UE's context record to indicate that the UE is now operating in the connected mode.

In line with the discussion above, each MME in the representative LTE network 12 may have a respective limit on the number of context records that the MME is allowed to store (perhaps a license seat allowance in exchange for payment of a particular license fee). The context record limit may be the same for each MME or may differ per MME, and each MME may be provisioned with data indicating its context record limit, so that the MME can enforce the limit. In accordance with the present disclosure, the first MME 26 may be arranged to detect that is at or approaching threshold storage of context records and to responsively offload one or more of its stored context records for temporary storage at another MME, such as the second MME 28.

The first MME may detect threshold storage of context records by regularly monitoring the number of context records that the first MME has stored and detecting that the number is at or likely to be at a predefined threshold level. The predefined threshold level could be the context record limit of the first MME. Alternatively, the predefined threshold level could be a number of context records lower than that context record limit, possibly designated as a percentage of the context record limit, optimally close enough to the limit to be relevant.

In an implementation where each context record defines a database record, the first MME may maintain a record-count indicating how many such context records the first MME currently has stored at any given time. Periodically or in response to one or more other triggers, the first MME may then evaluate that record-count to determine if the record-count is threshold high, such as whether it is at least the predefined threshold level. If the first MME determines that the record-count is threshold high, then the first MME be considered to have detected that it is at threshold context record storage.

Further, the first MME may maintain a persistent record or rolled-up data indicating how many context records the first MME stores at particular times of day, on particular days of the week, or at other particular times or in other particular circumstances. Based on a current or approaching time of day or other circumstance, the first MME may then refer to that data to predict based on past experience how many context records the first MME is likely to store at that time of day or in that circumstance. If that determined number of context records is threshold high, then the first MME may likewise be considered to have detected that it is at or approaching threshold context record storage.

In parallel with or in response to detecting threshold storage of context records by the first MME, the first MME may also select one or more UEs that are served by the first MME but that are in the idle mode, to then offload the context record of each such UE to another MME. In particular, in line with the discussion above, the first MME may select one or more UEs that are served by the first MME and that have been idle for a long time, such as for at least a predefined threshold duration or for the longest time of various UEs served by the first MME. To facilitate this selection, the first MME may keep track of the idle duration of each UE that the first MME serves and that is in the idle mode, such as by recording in each such UE's context record a timestamp when the UE transitions to idle mode and, when appropriate, comparing those timestamps of various UEs with a current time. The number of UEs that the first MME selects to have their context records temporarily offloaded to another MME may depend on how close the MME is to reaching its context record limit. For instance, the first MME may select a greater number of UEs if the first MME is closer to its limit, and vice versa. Further, the number of UEs that the first MME selects may depend on other factors as well.

In addition, the first MME may select a target MME to which the first MME will temporarily offload the selected UEs' context records. To facilitate this, the first MME may query one or more other MMEs via their S10 interfaces, and each other MME may respond to the first MME with an indication of how many more context records the other MME can currently store or is likely to be able to store (possibly considering past experience per time or the like as discussed above). Alternatively, various MMEs in the network may periodically push their context record storage data (e.g., record-counts or percentages of context record limits) to other MMEs, so that the first MME may already have an indication for each of various other MMEs how many more context records the other MME can currently store or is likely to be able to store. Still alternatively, the LTE network may include a server (not shown, or integrated with any element shown) that regularly polls various MMEs to track how many more context records they can store or are likely to be able to store, and the first MME may query that server to determine which MME to select as a target MME. These communications to and from MMEs may be done using newly defined messages or adaptations of existing messages in the LTE network.

In an example implementation, the first MME 26 may thereby select the second MME 28 as the target MME to offload the context record of each selected UE. Thus, the first MME may then offload each such UE's context record to the second MME for storage by the second MME even though the first MME is serving the UE and the second MME is not serving the UE. To do so, the first MME may read the context record from its data storage and transfer the context record as payload in a newly defined offload message to the second MME, via the S10 interface between the first MME and second MME, and the first MME may delete the record from its own storage thereby freeing up context record storage capacity. Upon receipt of each such context record from the first MME, the second MME may then store the context record in its own data storage, using up one of its spaces (e.g., license seats) for context record storage. Further, the second MME may send an acknowledge message to the first MME.

At this point, the second MME, rather than the first MME, stores the context record for at least one UE that is served by the first MME and that is not served by the second MME. Yet other elements of the LTE network may be completely unaware of this offloading. For instance, eNodeB 16 may have no record of this offloading. Thus, when eNodeB has a signaling message to send to the MME serving the UE, the eNodeB will send that signaling message to the first MME, since that is the MME that the eNodeB knows is serving the UE. Similarly, when the gateway system has data to send to the UE, the gateway system may signal to the first MME to cause the UE to be paged, since that is the MME that the gateway system knows is serving the UE. Still similarly, if an IWS seeks to signal a circuit-switched fallback call to the MME serving the UE, the IWS will signal to the first MME, since that is the MME that the IWS knows is serving the UE. Further, the process can be seamless from the UE perspective, avoiding the need to have the UE detach and reattach in order to have context transferred to the second MME, as the UE will still be served by the first MME.

In practice, while a UE's context record is offloaded from the first MME to the second MME, the first MME may thus receive a signaling message that will triggers the first MME to take action for the UE. For example, the first MME may receive a tracking area update from the UE or a message from the eNodeB indicating that the UE is transitioning from the idle mode to the connected mode or the like, which may trigger the first MME to update the UE's context record. As another example, the first MME may receive from the gateway system a signaling message that triggers the first MME to page the UE. And as still another example, the first MME may receive from an IWS a signaling message that triggers the first MME to page the UE or to otherwise engage in signaling to facilitate setup of a circuit-switched fallback call. Other examples are possible as well.

When the first MME receives a signaling message that triggers the first MME to take action for a UE that the first MME serves but whose context record is currently offloaded to the second MME, the first MME may then responsively retrieve the UE's context record from the second MME, store the context record, and then take the action. To retrieve the UE's context record, the first MME may send a newly defined retrieval request message to the second MME via their S10 interface, specifying the UE by an identifier to which the context record is keyed. The second MME may then respond to that retrieval request message by reading the UE's context record from its data storage and transferring the context record as payload in a newly defined offload message to the second MME, via the S10 interface between the second MME and first MME, and the second MME may delete the record from its own storage. Upon receipt of each the context record back from the second MME, the first MME may then store the context record in its own data storage and may send an acknowledge message to the second MME.

Once the first MME has retrieved the UE's context record, or in anticipation of doing so, the first MME may then take the action for the UE. For example, if the first MME had received a tracking area update from the UE or a message indicating transition of the UE from the idle mode to the connected mode, the first MME may then update the UE's context record accordingly. As another example, if the first MME had received from the gateway system or IWS a signaling message that triggers the first MME to page the UE, the first MME may then refer to the UE's context record to determine the UE's serving eNodeB and/or tracking area and may then direct paging of the UE via that eNodeB and/or tracking area.

Note that in this process, when the second MME is storing a UE's context record for the first MME, the first MME is still the MME serving the UE, and the second MME is not serving the UE. On the other hand, during that time, the second MME may be serving one or more other UEs. Further, at some other time, the second MME may offload one or more context records for UEs served by the second MME to the first MME or to other MMEs in line with the discussion above.

Figure 2:
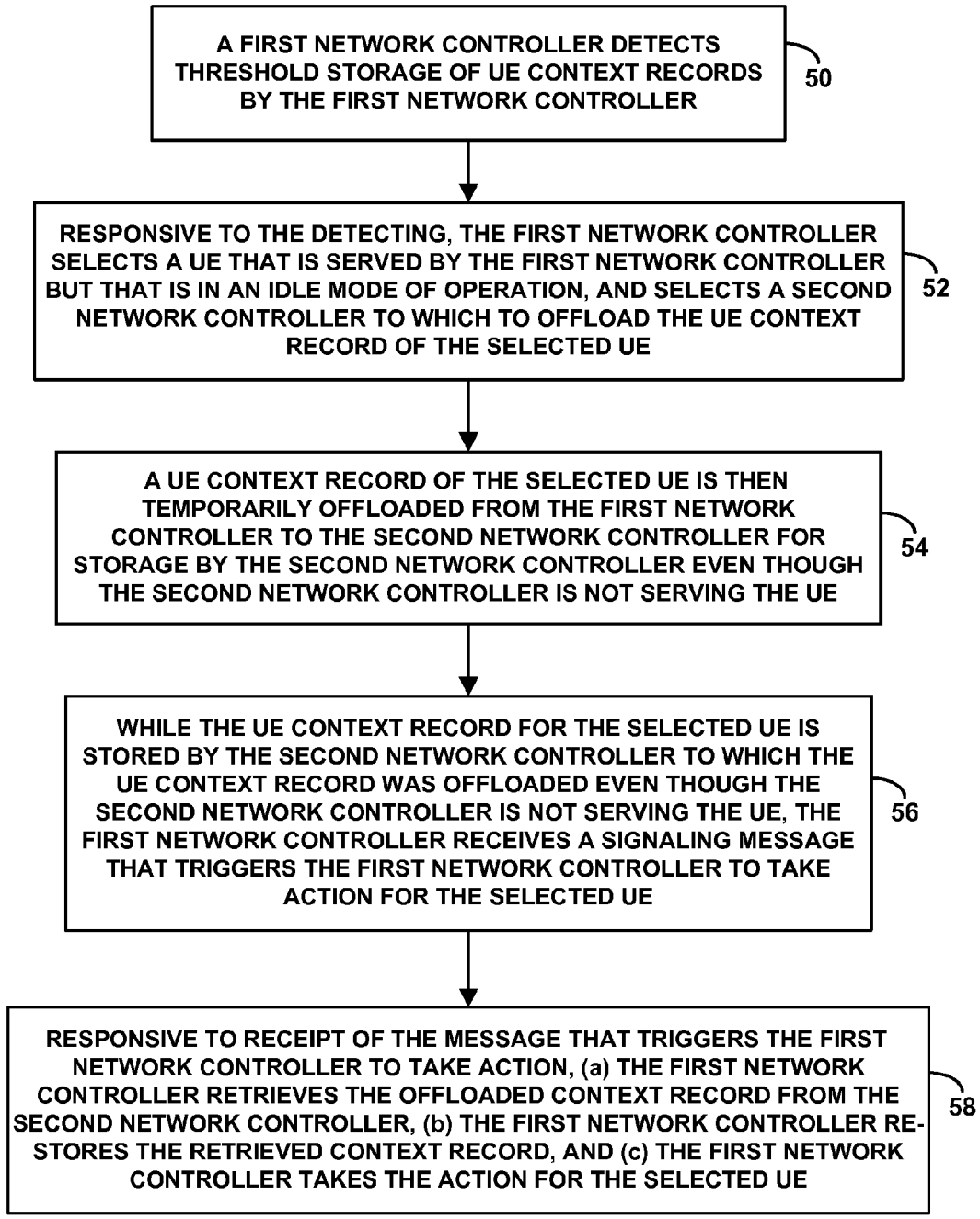
FIG. 2 is a flow chart depicting functions that can be carried out in accordance with the disclosure.

FIG. 2 is next a flow chart depicting in summary a set of functions that can be carried out in accordance with the present disclosure, in a communication network having a plurality of network controllers configured to serve UEs, where each network controller stores a UE context record respectively for each of a plurality of UEs that the network controller serves, and wherein each network controller has a respective context record limit (e.g., established by license agreement) defining a maximum number of UE context records storable by the network controller.

As shown in FIG. 2, at block 50, a first network controller detects threshold storage of UE context records by the first network controller. At block 52, responsive to that detecting, the first network controller selects a UE that is served by the first network controller but that is in an idle mode of operation (e.g., selecting the UE based on its being in the idle mode of operation) and selects a second network controller to which to offload the UE context record of the selected UE. And at block 54, the UE context record of the selected UE is then temporarily offloaded from the first network controller to the second network controller for storage by the second network controller even though the second network controller is not serving the UE. As a result, the second network controller rather than the first network controller then stores the UE context record for the selected UE.

In turn, at block 56, while the UE context record for the selected UE is stored by the second network controller to which the UE context record was offloaded even though the second network controller is not serving the UE, the first network controller receives a signaling message (i.e., one or more messages) that triggers the first network controller to take action for the selected UE. And at block 58, responsive to receipt of the message that triggers the first network controller to take action, (a) the first network controller retrieves the offloaded context record from the second network controller, (b) the first network controller re-stores the retrieved context record, and (c) the first network controller takes the action for the selected UE.

In line with the discussion above, the act of detecting threshold storage of UE context records by the first network controller may involve detecting that the first network controller currently has stored a quantity of UE context records that is at least a predefined threshold quantity, such as the context record limit of the first network controller. Alternatively or alternatively, the act of detecting threshold storage of UE context records by the first network controller may involve detecting, based at least in part on records of past storage of UE context records by the first network controller, that the first network controller is going to be storing a quantity of UE context records that is at least a predefined threshold quantity, such as the context record limit of the first network controller.

Further in line with the discussion above, the communication network may be an LTE network, and the plurality of network controllers may be MMEs. In that case, the act of temporarily offloading the UE context record of the selected UE from the first network controller to the second network controller for storage by the second network controller may involve transferring the UE context record of the selected UE from the first network controller to the second network controller via an S10 interface.

In addition, as discussed above, the UE context record for the selected UE may include for the selected UE (a) a UE identifier, (b) UE subscription information, and (c) UE capability information. Further, the first network controller may manage bearer setup and bearer teardown for each UE served by the first network controller, and the UE context record for the selected UE may additionally include a specification of one or more bearers established for the selected UE.

Still further, the act of the first network controller selecting the second network controller to which to offload the UE context record of the selected UE may involve the first network controller selecting the second network controller based at least in part on the second network controller a having threshold low storage of UE context records (e.g., being able to store at least a predefined threshold number of UE context records before reaching its context record limit).

Figure 3:
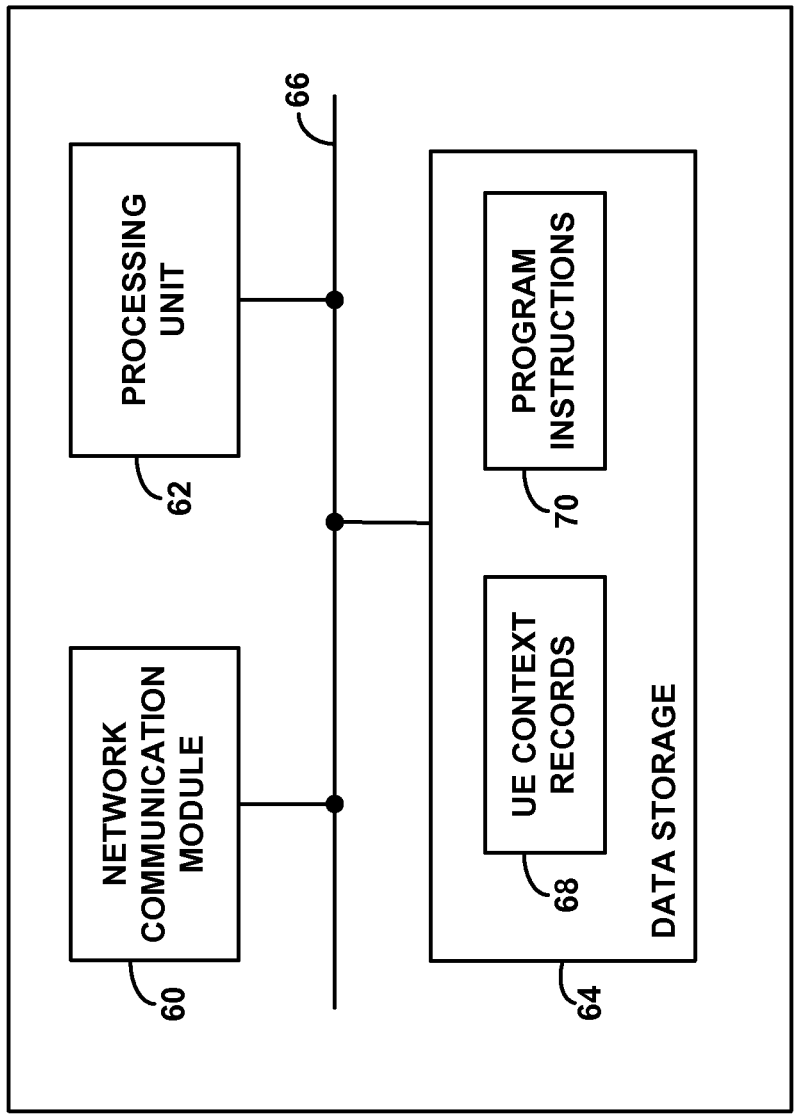
FIG. 3 is a simplified block diagram of a representative network node operable within the arrangement of FIG. 1.

Finally, FIG. 3 is a simplified block diagram of an example network controller (such as an MME) of the type discussed above, configured to carry out functions in accordance with the present disclosure. As shown, the example network controller includes a network communication module 60, a processing unit 62, and data storage 64, all of which may be integrated together or communicatively linked together by a system bus, network, or other connection mechanism 66.

The network communication module 60 may facilitate wired and/or wireless communication with various other entities. For instance, the network communication module 60 may be an Ethernet interface or other module for coupling with a core network so as to communicate with other entities such as various base stations and gateways for example.

The processing unit 62 may then comprise one or more general purpose processors (e.g., microprocessors) and/or one or more special purpose processors (such as application specific integrated circuits and/or digital signal processing units) and may be integrated in whole or in part with the network communication module. Further, the data storage 64 may include one or more volatile and/or non-volatile storage components, such as magnetic, optical, or flash storage, and may be integrated in whole or in part with the processing unit.

As shown, the data storage 64 is arranged to hold UE context records 68 of the type discussed above. Further, the data storage may hold program instructions 70 executable by the processing to cause the network controller to carry out various functions described herein.

Exemplary embodiments have been described above. Those skilled in the art will understand, however, that changes and modifications may be made to these embodiments without departing from the true scope and spirit of the invention. For instance, although the above description focuses primarily on network controllers such as MMEs, the same principles could be applied with respect to other network control nodes, such to transfer of UE context records between base stations such as eNodeBs. That is, in other implementations, the network controller at issue could be a base station or another node that serves to control one or more aspects of network operation. Moreover, although the above description focuses on license restrictions, other reasons for temporarily offloading context records from one network controller to another in accordance with the present disclosure may exist.

We claim:

1. A method operable in a communication network, wherein the communication network has a plurality of network controllers configured to serve user equipment devices (UEs), wherein each network controller stores a UE context record respectively for each of a plurality of UEs that the network controller serves, and wherein each network controller has a respective context record limit defining a maximum number of UE context records storable by the network controller, the method comprising:

detecting, by a first network controller of the plurality of network controllers, threshold storage of UE context records by the first network controller; and responsive to the detecting, selecting by the first network controller a UE that is served by the first network controller but that is in an idle mode of operation, wherein selecting the UE is based on the UE being in the idle mode of operation, and temporarily offloading the UE context record of the selected UE from the first network controller to a second network controller for storage by the second network controller even though the second network controller is not serving the UE, wherein the second network controller rather than the first network controller then stores the UE context record for the selected UE.

2. The method of claim 1, further comprising:

while the UE context record for the selected UE is stored by the second network controller to which the UE context record was offloaded even though the second network controller is not serving the UE, receiving by the first network controller a signaling message that triggers the first network controller to take action for the selected UE; and responsive to receipt of the message that triggers the first network controller to take action, (a) retrieving by the first network controller the offloaded context record from the second network controller, (b) re-storing by the first network controller the retrieved context record, and (c) taking the action by the first network controller for the selected UE.

3. The method of claim 2, wherein detecting threshold storage of UE context records by the first network controller comprises detecting that the first network controller currently has stored a quantity of UE context records that is at least a predefined threshold quantity.

4. The method of claim 3, wherein the predefined threshold quantity is the context record limit of the first network controller.

5. The method of claim 2, wherein detecting threshold storage of UE context records by the first network controller comprises detecting, based at least in part on records of past storage of UE context records by the first network controller, that the first network controller is going to be storing a quantity of UE context records that is at least a predefined threshold quantity.

6. The method of claim 5, wherein the predefined threshold quantity is the context record limit of the first network controller.

7. The method of claim 2, wherein the communication network is a Long Term Evolution (LTE) network, wherein the plurality of network controllers are Mobility Management Entities (MMEs), wherein temporarily offloading the UE context record of the selected UE from the first network controller to a second network controller for storage by the second network controller comprises transferring the UE context record of the selected UE from the first network controller to the second network controller via an S10 interface.

8. The method of claim 2, wherein the respective context record limit is established by license agreement.

9. The method of claim 2, wherein the UE context record for the selected UE includes for the selected UE (a) a UE identifier, (b) UE subscription information, and (c) UE capability information.

10. The method of claim 2, wherein the first network controller manages bearer setup and bearer teardown for each UE served by the first network controller, and wherein the UE context record for the selected UE further includes a specification of one or more bearers established for the selected UE.

11. The method of claim 2, further comprising:
selecting, by the first network controller, the second network controller to which to offload the UE context record of the selected UE, wherein the selecting of the second network controller is based at least in part on the second network controller a having threshold low storage of UE context records.

12. The method of claim 2, wherein the signaling message that triggers the first network controller to take action for the selected UE is a signaling message selected from the group consisting of:
a page trigger message indicative of incoming traffic to be transmitted to the selected UE, wherein the action comprises paging the selected UE, and
a reconnection message, indicative of a transition of the selected UE from the idle mode of operation to a connected mode of operation.

13. A communication system comprising:
a plurality of network controllers configured to serve user equipment devices (UEs), wherein each network controller stores a UE context record respectively for each UE of a plurality of UEs that the network controller serves, and wherein each network controller has a respective context record limit defining a maximum number of UE context records storable by the network controller,
wherein a first network controller of the plurality of the network controllers is configured to detect threshold storage of UE context records by the first network controller and, responsive to detecting the threshold storage of UE context records by the first network controller, (a) to select a UE that is served by the first network controller but that is in an idle mode of operation, wherein selecting the UE is based on the UE being in the idle mode of operation, and (b) to temporarily offload the UE context record of the selected UE from the first network controller to a second network controller for storage by the second network controller even though the second network controller is not serving the UE, wherein the second network controller rather than the first network controller then stores the UE context record for the selected UE.

14. The communication system of claim 13,
wherein the first network controller is configured to receive, while the UE context record for the selected UE is stored by the second network controller to which the UE context record was offloaded even though the second network controller is not serving the UE, a signaling message that triggers the first network controller to take action for the selected UE, and
wherein the first network controller is configured to respond to receipt of the control message that triggers the first network controller to take action, by (a) retrieving the offloaded context record from the second network controller, (b) re-storing the retrieved context record, and (c) taking the action for the selected UE.

15. The communication system of claim 14, wherein the plurality of network controllers are Long Term Evolution (LTE) Mobility Management Entities (MMEs), wherein temporarily offloading the UE context record of the selected UE from the first network controller to a second network controller for storage by the second network controller comprises transferring the UE context record of the selected UE from the first network controller to the second network controller via an S10 interface.

16. The communication system of claim 14, wherein the respective context record limit is established by license agreement.

17. A Mobility Management Entity (MME) operable in a Long Term Evolution (LTE) network, wherein the MME is arranged to serve a plurality of user equipment devices (UEs), the MME comprising:
a network communication interface for communicating with other entities of the LTE network;
a processing unit;
data storage for holding UE context records, wherein the UE context records comprise a UE context record respectively for each UE of the plurality of UEs served by the MME; and
program instructions stored in the data storage and executable by the processing unit to cause the MME to carry out functions comprising (a) detecting threshold storage by the MME of UE context records, (b) responsive to the detecting, selecting a UE that is served by the MME and that is currently in an idle mode of operation, wherein selecting the UE is based on the UE being in the idle mode of operation, and (c) temporarily offloading the UE context record of the selected UE from the MME to another MME that is not currently serving the UE.

18. The MME of claim 17, wherein the functions further comprise (d)
while the UE context record for the selected UE is stored by the other MME that is not currently serving the UE, receiving a signaling message that triggers the MME to take action for the selected and (e) responsive to receipt of the message that triggers the MME to take action, (i) retrieving the offloaded context record from the other MME, (ii) re-storing the retrieved context record, and (iii) taking the action for the selected UE.

19. The MME of claim 17, wherein the respective context record limit is established by license agreement.

* * * * *